United States Patent [19]

Azuma et al.

[11] Patent Number: 4,853,204
[45] Date of Patent: Aug. 1, 1989

[54] METHOD FOR PRODUCTION OF OXIDATION-RESISTANT SILICON NITRIDE MATERIAL

[75] Inventors: Nobuyuki Azuma, Kasugai; Minoru Maeda, Konan; Kazuo Nakamura, Owari-Asahi, all of Japan

[73] Assignee: Agency of Industrial Science & Technology, Ministry of International Trade & Industry, Tokyo, Japan

[21] Appl. No.: 133,627

[22] Filed: Dec. 16, 1987

[30] Foreign Application Priority Data

Dec. 23, 1986 [JP] Japan .................................. 61-307547

[51] Int. Cl.$^4$ ...................... B05D 3/02; C01B 21/063; C01B 33/06
[52] U.S. Cl. .................................... 423/344; 156/664; 156/667; 427/154; 427/376.1; 427/376.2; 427/377
[58] Field of Search .................... 427/376.2, 377, 154, 427/376.1; 423/344; 156/664, 667

[56] References Cited

U.S. PATENT DOCUMENTS 3,455,729  7/1969  Deeley et al. ....................... 427/255
4,104,442  8/1978  Sussmuth ........................... 427/377

*Primary Examiner*—John Doll
*Assistant Examiner*—Loris Freeman
*Attorney, Agent, or Firm*—Oblon, Spivak, McClelland, Maier & Neustadt

[57] ABSTRACT

An oxidation-resistant silicon nitride material possessing a surface layer of a phase of closely packed crystals is produced by a procedure which comprises covering the surface of a silicon nitride substrate with a layer of an alkali metal compound, firing the coated substrate at a temperature of between 800° C. and 1,300° C., thereby forming an alkali metal-containing vitreous coating layer on the surface of the silicon nitride substrate, and thereafter removing the coating layer.

3 Claims, 1 Drawing Sheet

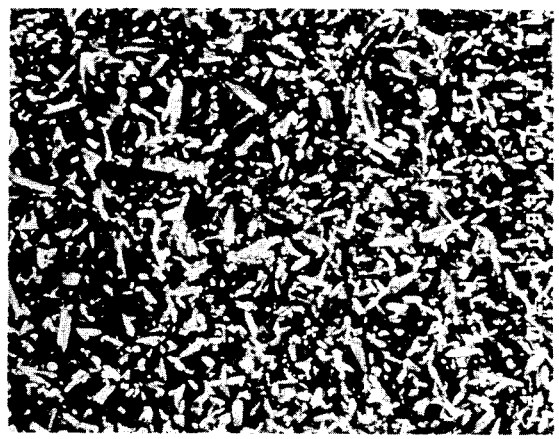

METHOD FOR PRODUCTION OF OXIDATION-RESISTANT SILICON NITRIDE MATERIAL

BACKGROUND OF THE INVENTION

1. Field of the Invention

This invention relates to a method for the production of a silicon nitride material with improved properties obtained by forming a phase of closely packed crystals in the surface region thereof. More particularly, the present invention relates to a method for the production of silicon nitride material excelling in resistance to heat, resistance to thermal shock, and mechanical strength, which method comprises giving a silicon nitride substrate a specific surface treatment thereby educing in the surface region of the substrate a phase of closely packed crystals of silicon nitride.

2. Prior Art Statement

Since sintered articles of silicon nitride are excellent in physical properties such as resistance to heat, resistance to thermal shock, and mechanical strength and are capable of being molded in desired shapes with high accuracy, efforts have been made to promote their utilization as heat-resistant structural materials in gas turbines and automobile engines. These sintered articles have bright prospects for expanding application.

Unfortunately, silicon nitride has a serious disadvantage in that it is difficult to sinter and the sintered articles of this compound are susceptible to oxidation in the air at elevated temperatures. Various methods aimed at eliminating this disadvantage have been proposed. These include, for example, a reaction sintering method which comprises mixing silicon nitride powder with a specific oxide powder and heating the resultant mixture at an elevated temperature thereby inducing mutual reaction of the two compounds, a hot-press method which comprises mixing silicon nitride powder with various oxide powders serving as a catalyst and treating the resultant mixture at elevated temperatures under increased pressure, and a high-pressure gas method which effects the reaction in an atmosphere of nitrogen gas kept at elevated temperatures. However, these methods require use of special devices and entail large consumption of energy. Moreover, the sintered articles produced by these methods do not always acquire a dense texture and more often than not contain pores. For example, even in the case of a sintered article of silicon nitride obtained by the hot-press treatment at 1,850° C. for 1 hour, an observation of a cross section of this sintered article reveals that numerous pores about 2 to 3 μm in diameter are present in the texture.

If a sintered article contains such pores, it is liable to undergo oxidation in the air at elevated temperatures and induce various detrimental phenomena. For example, the oxygen in the air diffuses through the pores into the texture of the sintered article and, at a temperature of about 700° C., forms a thin film amorphous silicon dioxide texture and, then at a higher temperature of about 1,200° C., crystallizes as cristobalite and, in the meantime, gives rise in the surface region of the sintered article to an oxidation product of large bulk and low melting point comprising silicate containing a sintering aid like $Y_2O_3$ and a vitreous matter. Since the thermal expansion coefficient of the oxidation product differs considerably from that of silicon nitride, the oxidation product eventually imparts cracks and separations to the aforementioned sintered article of silicon nitride.

When a silicon nitride material lacks dense texture and contains pores as described above, it offers poor resistance to oxidation at elevated temperatures and, therefore, has only limited utility as structural materials, which by nature require resistance to high temperature. As means for modifying the surface of the silicon nitride material, a ceramic coating method, a vacuum deposition method using plasma flame spraying or CVD, and a method for forming a protective coating film on the surface of a substrate as by an ion beam or laser are now under a study.

No method has yet been developed which is capable of uniformly and economically superposing on the surface of a silicon nitride substrate of large surface area and complicated shape an oxidation-resistance protective film exhibiting desirable adhesiveness to the silicon nitride substrate and possessing a thermal expansion coefficient approximating that of silicon nitride.

OBJECT AND SUMMARY OF THE INVENTION

An object of the invention is to provide a method for forming on the surface of a silicon nitride substrate of any configuration an oxidation-resistant protective film having a thermal expansion coefficient substantially equal to that of silicon nitride substrate, thereby enabling economical production of silicon nitride materials exhibiting excellent oxidation-resistance.

As the result of a study for finding a silicon nitride material excelling in resistance to oxidation, the inventors have found that an oxidation-resistant silicon nitride material possessing in the surface region thereof a phase of closely packed crystals is obtained by covering the surface of a silicon nitride substrate with a layer of an alkali metal compound, firing the resultant coated substrate at a prescribed temperature thereby giving rise to a homogeneous phase of silicon nitride crystals in the surface region of the substrate and further to an alkali metal-containing vitreous coating layer superposed on the homogeneous phase of silicon nitride crystals, and thereafter removing the coating layer. They have ascertained that this oxidation-resistant silicon nitride material meets the aforementioned object of this invention. The present invention has been perfected on the basis of this finding.

To be more specific, this invention is directed to a method for the production of an oxidation-resistant silicon nitride material having a phase of closely packed crystals in the surface region thereof, which method comprises covering the surface of a silicon nitride substrate with a layer of an alkali metal compound, then firing the silicon nitride substrate now coated with the layer of alkali metal compound at a temperature in the range of 800° to 1,300° C. in the presence of oxygen thereby superposing on the surface of the silicon nitride substrate a coating layer substantially consisting of an alkali metal-containing vitreous substance, and subsequently removing the coating layer.

BRIEF DESCRIPTION OF THE DRAWING

The drawing attached hereto is a photograph of the crystalline structure in the surface region of a silicon nitride material produced in Example 1, taken through a scanning electron microscope at 1,000 magnifications.

DETAILED DESCRIPTION OF THE PREFERRED EMBODIMENTS

Now, the present invention will be described in detail below.

As the silicon nitride substrate to be used in the method of this invention, there can be adopted the porous sintered silicon nitride material obtained by any of the conventional methods such as, for example, the normal pressure sintering method, reaction sintering method, and hot-press sintering method. This invention can use silicon nitride substrates of any shape or size.

As examples of the alkali metal compound to be advantageously used for the formation of a layer on the surface of the aforementioned silicon nitride substrate, there can be cited halogenides, carbonates, nitrates, and sulfates of alkali metals such as lithium, potassium, and sodium. One member or a mixture of two or more members selected from the group mentioned above can be used. The alkali metal compound so selected may be used in the form of a powder or an aqueous solution. When it is used as a powder, the particles of the powder are generally desired to have diameters of not more than 20 μm. The reason for this fineness of the powder is that the uniformity and smoothness with which the reaction proceeds increases with decreasing diameter of the particles of the powder.

This alkali metal compound is desired to be applied on the surface by such means as spreading or spraying so as to form a layer having a coating weight in the range of 2 to 30 mg per unit surface area (cm$^2$).

The reason for this range of weight is that since the reaction of oxidation is affected by the alkali metal compound, the produced layer shows virtually no discernible effect if the weight thereof is not more than 2 mg and the layer flows down and may possibly adhere to the interior of the furnace if the weight exceeds 30 mg.

Optionally during the formation of the layer of this alkali metal compound, a binder such as methyl cellulose or dextrin may be used, when desired, for the purpose of fortifying the surface of the applied layer after desiccation. The amount of the binder thus used generally falls in the range of 10 to 30 mg, based on 2 g of the alkali metal compound. To be specific, the use of the binder for the aforementioned purpose is effected by adding 10 to 30 mg of the binder to 2 g of the alkali metal compound, dissolving the resultant mixture in 20 ml of distilled water to produce an aqueous solution, and applying this aqueous solution to the surface.

In the method of this invention, after the layer of the alkali metal compound is formed on the surface of the silicon nitride substrate as described above, the coated substrate is fired at a temperature in the range of 800° to 1,300° C., preferably 850° to 1,100° C., in the presence of oxygen.

If the temperature is unduly low, the reaction described later and represented by formula (I), $Si_3N_4 + 3/2 \cdot O_2 \rightarrow 3SiO(g) + 2N_2(g)$, does not proceed.

If the temperature is unduly high, the oxidation proceeds further beyond the scope of the reaction of formula (I) toward the oxidation into $SiO_2$ as through the path of $Si_3N_4 + 3O_2 \rightarrow 3SiO_2 + 2N_2$ and, therefore, prevents the occurrence of $SiO_2(g)$ in the melt.

While the firing is generally carried out in the air, it may be carried out, when desired, in a mixed gas of oxygen and nitrogen or a mixed gas of air and nitrogen.

The time for sufficient firing generally falls in the range of 5 to 30 hours.

By the firing treatment described above, a homogeneous phase of silicon nitride crystals is produced in the surface region of the silicon nitride substrate and a coating layer consisting of an alkali metal-containing vitreous substance is further formed on the surface region.

The surface region consisting of the phase of crystals has a thickness roughly in the range of 10 to 30 μm.

The formation of the phase of silicon nitride crystals and that of the coating layer of vitreous substance mentioned are presumed to arise by the following mechanism.

When the alkali metal compound is applied on the surface of the silicon nitride substrate and the coated substrate is fired at a temperature in the range of 800° to 1,300° C. in the presence of oxygen, the applied layer of the alkali metal compound is melted and converted into a liquid phase and, through the medium of this liquid phase, silicon nitride is oxidized as shown by the reaction formula (I) to give rise to silicon monoxide in a gaseous state. This gaseous silicon monoxide, in the aforementioned liquid phase, is decomposed into gaseous silicon dioxide and gaseous silicon as shown by the reaction formula (II) below. Then, the gaseous silicon reacts with the nitrogen dissolved in the aforementioned liquid phase and, consequently, gives rise to crystalline silicon nitride. Thus, the phase of closely packed crystals of silicon nitride is formed in the surface region of the substrate.

$$Si_3N_4 + 3/2 \cdot O_2 \rightarrow 3SiO(g) + 2N_2(g) \qquad (I)$$

$$3SiO(g) \rightarrow 1.5SiO_2(g) + 0.5Si_3(g) \qquad (II)$$

$$0.5Si_3(g) + N_2(g) \rightarrow 0.5Si_3N_4(s) \qquad (III)$$

(wherein (g) stands for gaseous state and (s) for solid state).

The silicon nitride formed in the aforementioned reaction formula (III) is found by X-ray diffraction to be stable β-$Si_3N_4$.

In the meantime, the greater part of the gaseous silicon dioxide formed in the aforementioned reaction formula (II) dissolves into the aforementioned liquid phase and reacts with the alkali metal compound as shown by the reaction formula (IV) below and consequently gives rise to an alkali metal-containing vitreous substance, with the result that the coating layer consisting of the alkali metal-containing vitreous substance is superposed on the aforementioned phase of silicon nitride crystals.

$$M_2O(l) + 1.5SiO_2(g) \rightarrow \tfrac{1}{2}M_2SiO_3(s) + \tfrac{1}{2}M_2Si_2O_5(s) \qquad (IV)$$

(wherein M stands for an alkali metal, (l) for liquid state, and (s) for solid state).

The coating layer of the alkali metal-containing vitreous substance formed as described above possesses a low melting point and, therefore, must be removed. This removal of the coating layer may be attained, for example, by immersing the coated substrate in a phosphoric acid solution and keeping it therein at a temperature in the range of 200° to 300° C. for a period roughly in the range of 5 minutes to one hour or by keeping the coated substrate immersed in an aqueous solution of 5 to 20% by weight of hydrofluoric acid at room temperature for a period roughly in the range of 5 minutes to one hour.

As a result, there is obtained a silicon nitride material incorporating in the surface region thereof a phase of uniformly and closely packed silicon nitride crystals and, therefore, excelling in resistance to oxidation. By observation under a microscope, this phase of crystals is found to have fibrous crystals 0.5 to 2 $\mu$m in thickness and 3 to 10 $\mu$m in length closely packed therein. By X-ray diffraction, this crystalline phase is found to be a single phase made up of stable $\beta$-silicon nitride.

In accordance with the method of this invention for the production of an oxidation-resistant silicon nitride material, a phase of uniformly and closely packed crystals of silicon nitride can be economically superposed by a very simple procedure in the surface region of a silicon nitride substrate. The silicon nitride material consequently obtained excels in resistance to heat and resistance to thermal shock and enjoys improvement in oxidation-resistance and mechanical strength and, therefore, suits manufacture of heat-resistant structural materials such as, for example, industrial materials for automobile engines and gas turbines and oxidation-resistant and corrosion-resistant materials for use at elevated temperatures in space, ocean, and environment development and in the development of coal liquefaction and gasification and utilization of geothermal energy.

Now, the present invention will be described more specifically below with reference to working examples. It should be noted, however, that the present invention is not limited in any way by these examples.

EXAMPLE 1

On the surface of a hot-press sintered mass of silicon nitride (having a surface area of 5.8 cm$^2$) heated to about 100° C., a solution of 2 g of lithium carbonate and 10 mg of methyl cellulose in 20 ml of distilled water was applied uniformly in such an amount with a brush that the amount of lithium deposited would reach 20 mg per cm$^2$ and the applied layer of the solution was dried. The sample thus produced was mounted on a boat of silicon carbide, set in place nearly in the central part of a high-alumina combustion tube, and then fired at 1,000° C. for 24 hours as swept with air fed at the rate of 500 ml/minute. Consequently, there was obtained a mass of silicon nitride coated uniformly with lithium glass. Under a metallurgical microscope, this composite mass was found to be covered with a cracked vitreous phase over the entire surface thereof. By X-ray diffraction, formation of $\beta$-Si$_3$N$_4$ in the mass was confirmed.

Then, the mass of silicon nitride mentioned above was immersed in 12 ml of phosphoric acid solution, heated therein to expel water by evaporation, further heated to 260° C., kept at this temperature for 10 minutes, then removed from the solution, washed with water, and dried. The surface region was observed under a scanning electron microscope. A photomicrograph (at 1,000 magnifications) taken during this observation is shown in the attached drawing. This photograph clearly shows that fibrous crystals 0.5 to 2 $\mu$m in thickness and 3 to 10 $\mu$m in length were formed as closely packed over the entire surface of the mass. This crystalline phase was identified by powder X-ray diffraction as a single phase of $\beta$-silicon nitride.

EXAMPLE 2

On the surface of a hot-press sintered mass of silicon nitride (having a surface area of 5.8 cm$^2$), a solution of 2 g of lithium fluoride and 12 mg of methyl cellulose in 20 ml of distilled water was applied in such an amount with a brush that the amount of lithium deposited would reach 20 mg per cm$^2$ and the applied layer of the solution was dried. The sample thus obtained was placed in the same furnace as in Example 1, swept with a current of dry air fed at a rate of 500 ml/minute and, at the same time, quickly heated from room temperature to 850° C. and, after reaching this temperature, heated at a decreased temperature increasing speed so as to reach 950° C. over a period of 12 hours, and then kept at this temperature for 12 hours to effect firing.

As a result, there was obtained a mass of silicon nitride uniformly coated with lithium glass. Under a metallurgical microscope, this composite mass was found to have formed a cracked vitreous phase over the entire surface thereof. By the X-ray diffraction, formation of $\beta$-silicon nitride was confirmed.

Then, the mass of silicon nitride mentioned above was immersed in 12 ml of phosphoric acid, heated therein at 260° C. for 10 minutes, then removed from the solution, and dried. When the surface region of this mass observed under a scanning electron microscope, it was confirmed that fibrous $\beta$-silicon nitride crystals 0.5 to 2 $\mu$m in thickness and 5 to 10 $\mu$m in length were formed over the entire surface.

Under the conditions of temperature elevation and retention involved in this example, fibrous $\beta$-silicon nitride crystals 0.3 to 1 $\mu$m in thickness and 5 to 10 $\mu$m in length were preponderantly formed because the liquid-phase reaction of oxidation proceeded slowly without entailing diffusion of lithium salt.

EXAMPLE 3

A normal pressure sintered mass of silicon nitride was prepared by following the procedure of Example 1, except that sodium carbonate was used in place of lithium carbonate. The sample thus obtained was placed in the furnace, swept with currents of air and nitrogen fed respectively at rates of 300 ml/minute and 100 ml/minute, quickly heated from room temperature to 1,000° C., and retained at this temperature for 24 hours to effect firing. Consequently, there was obtained a silicon nitride mass coated with sodium silicate glass.

Under a metallurgical microscope, this mass was found to have formed trydymite crystals partially and induced the phenomenon of molten bubbling. Since the sodium salt is prone to quick reaction, desirable results were obtained in the present example by introducing nitrogen and consequently lowering the partial pressure of oxygen.

Then, the mass of silicon nitride was immersed for 15 minutes in a solution of 1 part by weight of an aqueous 46 wt % hydrofluoric acid solution in 2 parts by weight of distilled water, then placed in aqua ammonia to expel the residual hydrofluoric acid, washed with water, and dried. In the surface region of the mass thus treated, fibrous $\beta$-silicon nitride crystals 0.6 to 1.5 $\mu$m in thickness and 2 to 5 $\mu$m in length were uniformly formed.

EXAMPLE 4

A sample was prepared by following the procedure of Example 1, except that a reaction sintered mass of silicon nitride was used in place of the hot press sintered mass of silicon nitride and potassium chloride was used in place of lithium carbonate. This sample was placed in the furnace, swept with currents of air and nitrogen fed respectively at rates of 300 ml/minute and 100 ml/minute and, at the same time, quickly heated from room temperature to 1,000° C., and kept at this temperature for 24 hours to effect firing. Consequently, there was obtained a mass of silicon nitride covered with potassium-containing glass. This mass was found to have formed a vitreous phase in the greater part and a melt in a limited part.

Then, the mass of silicon nitride was immersed for 15 minutes in a solution of 1 part by weight of an aqueous 46 wt % hydrofluoric acid solution in 3 parts by weight of distilled water, then placed in aqua ammonia to remove the residual hydrofluoric acid, washed with water, and dried. In the surface region of this mass, fibrous $\beta$-silicon nitride crystals 0.5 to 1.5 $\mu$m in thickness and 3 to 7 $\mu$m in length were uniformly formed.

EXAMPLE 5

A sample was prepared by following the procedure of Example 1, except that a mixture consisting of lithium fluoride, sodium carbonate, and sodium chloride (in a gravimetric ratio of 2:1:1) was used as an alkali metal compound. This sample was placed in the furnace, swept with currents of air and nitrogen fed respectively at rates of 300 ml/minute and 100 ml/minute and, at the same time, quickly heated from room temperature to 1,000° C., and kept at this temperature for 24 hours to effect firing. Consequently, there was obtained a mass of silicon nitride covered with an alkali metal-containing glass.

Then, the mass of silicon nitride was immersed for 15 minutes in a solution of 1 part by weight of an aqueous 46 wt % hydrofluoric acid in 3 parts by weight of distilled water, then placed in aqua ammonia to remove the residual hydrofluoric acid, washed with water, and dried. In the surface region of this mass, fibrous $\beta$-silicon nitride crystals 0.5 to 1.5 $\mu$m in thickness and 4 to 9 $\mu$m in length were uniformly formed. This mass was found to contain spherical depressions locally. Even in these depressions, fibrous crystals of a smaller length were formed.

EXAMPLE 6 THROUGH 19

In the surface regions of various sintered masses of silicon nitride indicated in Table 1, fibrous $\beta$-silicon nitride crystals were uniformly formed by using various alkali metal compounds, reaction conditions, and methods of removal of glass substance shown correspondingly in the same table. The results are shown in Table 1.

TABLE 1

| Example No. | Kind of sintered mass of silicon nitride[1] | Alkali metal compound Kind | Amount applied[2] (mg/cm²) | Reaction conditions Flow volume of air (nitrogen) (ml/min) | Temperature (°C.) | Time (hr) | Method of removal of vitreous substance[3] | Diameter ($\mu$m) and length ($\mu$m) of formed crystals |
|---|---|---|---|---|---|---|---|---|
| 6 | H | lithium sulfate | 28 | 300 (200) | 1,000 | 20 | P | 0.5 ~ 2 <br> 5 ~ 10 |
| 7 | H | lithium nitrate | 21 | 500 | 900 ~ 1,000 | 24 | P | 0.5 ~ 2 <br> 5 ~ 10 |
| 8 | R | lithium chloride | 23 | 500 | 900 ~ 1,000 | 24 | F | 0.5 ~ 2 <br> 5 ~ 10 |
| 9 | N | lithium carbonate | 19 | 300 (200) | 1,000 | 24 | P | 0.5 ~ 1.2 <br> 3 ~ 9 |
| 10 | R | potassium fluoride | 27 | 350 | 1,000 | 20 | F | 0.5 ~ 1.5 <br> 3 ~ 9 |
| 11 | N | potassium nitrate | 16 | 400 (100) | 950 | 20 | P | 0.5 ~ 1.5 <br> 3 ~ 8 |
| 12 | H | potassium sulfate | 12 | 300 | 950 | 24 | F | 0.5 ~ 1.5 <br> 3 ~ 8 |
| 13 | H | potassium silicofluoride | 19 | 400 | 900 ~ 1,000 | 18 | P | 0.5 ~ 1.5 <br> 3 ~ 7 |
| 14 | N | sodium chloride | 26 | 300 | 1,000 | 20 | P | 0.5 ~ 1.5 <br> 2 ~ 5 |
| 15 | R | sodium fluoride | 17 | 300 | 1,000 | 18 | F | 0.5 ~ 1.5 <br> 2 ~ 5 |
| 16 | H | sodium nitrate | 23 | 200 | 1,000 | 24 | F | 0.5 ~ 1.5 <br> 2 ~ 5 |
| 17 | H | sodium sulfate | 21 | 200 | 900 | 20 | P | 0.5 ~ 1.5 <br> 2 ~ 5 |
| 18 | R | sodium silicofluoride | 15 | 300 | 900 | 18 | P | 0.5 ~ 1.5 <br> 2 ~ 5 |
| 19 | H | lithium carbonate potassium carbonate sodium fluoride (weight ratio: 1:2:1) | 20 | 200 | 950 | 20 | F | 0.5 ~ 1 <br> 4 ~ 10 |

Note $^1$H for hot-press sintered mass, R for reaction sintered mass, and N for normal pressure sintered mass.
Note [2]Amount applied represents the amount of alkali metal applied.
Note [3]P: phosphoric acid solution F: hydrofluoric acid solution Test for resistance to spalling and resistance to oxidation:

Samples of the oxidation-resistant silicon nitride materials produced in Examples 9, 1, 12, and 16 were each subjected to 10 cycles of a procedure which comprised keeping a sample inserted for 20 minutes in a Kanthal Super box type electric furnace kept at 1,200° C. and then suddenly cooling the hot sample in the air. None of the samples was found to suffer from separation or exfoliation of the fibrous texture. This fact shows that they possessed ample resistance to spalling.

The samples were heated at 1,200° C. for 500 hours to determine their oxidation-resistance, based on the extent of increase in weight by heating.

Separately, samples of the hot-press sintered silicon nitride mass and the normal pressure sintered silicon nitride mass obtained respectively in Examples 1 and 3 were treated in the same manner as described above to determine their resistance to spalling and to oxidation. The results are shown in Table 2.

TABLE 2

| Example No. | Sintered mass | Coating agent | Increase of weight (mg/cm$^2$) | Change of sample surface and fibrous crystals |
|---|---|---|---|---|
| Silicon nitride material obtained by the method of this invention | | | | |
| 9 | N | lithium carbonate | 0.41 | β-Si$_3$N$_4$ fibrous texture |
| 1 | H | lithium carbonate | 0.13 | β-Si$_3$N$_4$ fibrous texture |
| 12 | H | potassium sulfate | 0.15 | β-Si$_3$N$_4$ fibrous texture |
| 16 | H | sodium nitrate | 0.19 | β-Si$_3$N$_4$ fibrous texture |
| Silicon nitride not undergone the treatment of this invention | | | | |
| | N | none | 0.59 | vitreous phase cracked |
| | H | none | 0.17 | Y$_2$S + cristobalite + cracks |

The surfaces of the untreated silicon nitride masses invariably lacked appreciable resistance to spalling. The silicon nitride materials obtained by the present invention invariably showed absolutely no change of fibrous texture and proved to be perfectly safe for practical use in terms of oxidation-resistance.

What is claimed is:

1. A method for the production of an oxidation-resistant silicon nitride material having a surface region thereof formed with a phase of closely packed crystals, which method consists essentially of coating the surface of a silicon nitride substrate with a layer of an alkali metal compound in a ratio of 2 to 30 mg per cm$^2$ of said substrate by supplying at least one alkali metal compound selected from the group consisting of halogenides, carbonates, nitrates, and sulfates of alkali metals in the form of either powder or aqueous solution to the surface of said substrate, firing the resultant covering substrate at a temperature in the range of 800° to 1,300° C. in the presence of oxygen thereby forming on the surface of said silicon nitride substrate a coating layer consisting substantially of an alkali metal-containing vitreous substance, and crystallizing the surface of said silicon nitride substrate, and then removing said coating layer to expose the crystallized surface of said silicon nitride substrate.

2. The method according to claim 1, wherein said alkali metal is at least one member selected from the group consisting of lithium, potassium, and sodium.

3. The method according to claim 1, wherein said removing of said coating layer of alkali metal-containing vitreous substance is effected with a phosphoric acid solution or a hydrofluoric acid solution.

* * * * *